(12) United States Patent
Negishi

(10) Patent No.: US 12,534,577 B2
(45) Date of Patent: Jan. 27, 2026

(54) ORGANOPOLYSILOXANE AND A COMPOSITION COMPRISING THE SAME

(71) Applicant: Shin-Etsu Chemical Co., Ltd., Tokyo (JP)

(72) Inventor: Kazuyuki Negishi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 604 days.

(21) Appl. No.: 17/999,228

(22) PCT Filed: May 12, 2021

(86) PCT No.: PCT/JP2021/018009
§ 371 (c)(1),
(2) Date: Nov. 18, 2022

(87) PCT Pub. No.: WO2021/235286
PCT Pub. Date: Nov. 25, 2021

(65) Prior Publication Data
US 2023/0220163 A1 Jul. 13, 2023

(30) Foreign Application Priority Data
May 21, 2020 (JP) .................. 2020-089203

(51) Int. Cl.
| C08G 77/18 | (2006.01) |
| C08G 77/04 | (2006.01) |
| C08G 77/06 | (2006.01) |
| C09D 183/04 | (2006.01) |
| C08K 5/56 | (2006.01) |

(52) U.S. Cl.
CPC ............. *C08G 77/18* (2013.01); *C08G 77/04* (2013.01); *C08G 77/06* (2013.01); *C09D 183/04* (2013.01); *C08K 5/56* (2013.01)

(58) Field of Classification Search
CPC ................. C08G 77/16; C08G 77/18
See application file for complete search history.

(56) References Cited

U.S. PATENT DOCUMENTS

| 4,144,221 | A | 3/1979 | Ikeda et al. | |
| 5,202,404 | A | 4/1993 | Takarada et al. | |
| 2005/0038220 | A1* | 2/2005 | Shin | C07F 7/21 528/33 |
| 2007/0088144 | A1* | 4/2007 | Kang | C09D 183/04 528/33 |
| 2014/0323677 | A1 | 10/2014 | Kitamura et al. | |
| 2015/0175749 | A1 | 6/2015 | Halbach et al. | |
| 2020/0392293 | A1 | 12/2020 | Negishi et al. | |
| 2021/0284843 | A1* | 9/2021 | Masui | C08J 5/18 |
| 2022/0073747 | A1* | 3/2022 | Fukaumi | C08K 5/07 |
| 2022/0396669 | A1* | 12/2022 | Fu | C09J 183/04 |
| 2023/0099527 | A1* | 3/2023 | Koebel | C08G 83/006 528/33 |
| 2024/0092976 | A1* | 3/2024 | Negishi | C08G 77/18 |

FOREIGN PATENT DOCUMENTS

| CA | 1016289 A | 8/1977 |
| EP | 1038907 A2 | 9/2000 |
| EP | 1231241 A1 | 8/2002 |
| JP | H03275726 A | 12/1991 |
| JP | 2000309753 A | * 11/2000 |
| JP | 2005023075 A | 1/2005 |
| JP | 2007146031 A | 6/2007 |

(Continued)

OTHER PUBLICATIONS

Machine translation of WO 2019/187255 (no date).*
Product data sheet for Shin Etsu X-40-9225 (no date).*
Machine translation of JP 2000-309753 (no date).*
English translation of International Search Report corresponding to International Patent Application No. PCT/JP2021/018009 (2 pages) (mailed Jun. 22, 2021).
Zhu et al. "Toughening of Rigid Silicone Resins" Polymeric Materials Science and Engineering, 79(192):192-193 (1998).

(Continued)

*Primary Examiner* — Marc S Zimmer
(74) *Attorney, Agent, or Firm* — Myers Bigel, P.A.

(57) ABSTRACT

One of purposes of the present invention is to provide an organopolysiloxane that has a low viscosity and allows a cured coating to achieve both high hardness and crack resistance, and provide a composition comprising the organopolysiloxane. An organopolysiloxane represented by the following average unit formula (1) and having a kinetic viscosity of 10 to 350 mm²/s at 25° C., wherein a proportion (%) of the number of silicon atoms in a unit represented by the following formula (1') to a total number of silicon atoms in all siloxane units of the organopolysiloxane is 10% or less, $$(SiO_{4/2})_a(R^1SiO_{3/2})_b(R^2_2SiO_{2/2})_c(R^3_3SiO_{1/2})_d(R^4O_{1/2})_e \quad (1)$$

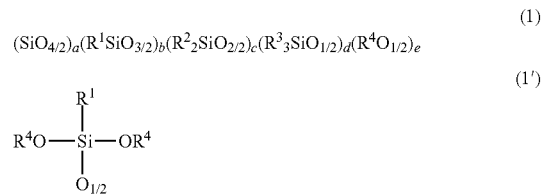

(1')

wherein $R^1$, $R^2$, and $R^3$ are, independently of each other, an unsubstituted or substituted, cyclic or non-cyclic alkyl group having 1 to 12 carbon atoms that may include an ether bond, or an unsubstituted or substituted aryl group having 6 to 12 carbon atoms, $R^4$ is a hydrogen atom or an alkyl group having 1 to 10 carbon atoms, and a, b, c, d and e are numbers satisfying the equations 0.2≥a≥0, 1≥b>0, 0.75≥c≥0, 0.2≥d≥0 and 1≥e>0, provided that a+b+c+d=1.

20 Claims, No Drawings

(56) References Cited

FOREIGN PATENT DOCUMENTS

| | | |
|---|---|---|
| JP | 2015522096 A | 8/2015 |
| JP | 2015182980 A | 10/2015 |
| JP | 2019089940 A | 6/2019 |
| WO | 2013031798 A1 | 3/2013 |
| WO | 2019098163 A1 | 5/2019 |
| WO | WO-2019187255 A1 * 10/2019 | ............ C01B 33/18 |
| WO | WO-2021116035 A1 * 12/2020 | |

OTHER PUBLICATIONS

Extended European Search Report for corresponding European Application No. 21807998.6 (Apr. 3, 2024).

* cited by examiner

ORGANOPOLYSILOXANE AND A COMPOSITION COMPRISING THE SAME

TECHNICAL FIELD

The present invention relates to an organopolysiloxane and a composition comprising the same. Specifically, the present invention relates to an organopolysiloxane having a specific siloxane constituent and a coating composition comprising the same.

BACKGROUND ART

Nowadays, silicone resins are widely used in various fields because of their superior properties in respect of water repellency, heat resistance, weatherability, freeze resistance, electrical insulation properties, chemical resistance, and safety to the human body. In particular, organopolysiloxanes having a three-dimensional cross-linked structure composed mainly of $SiO_2$ units (Q units) and $RSiO_{1.5}$ units (T units, wherein R is an organic group such as an alkyl group or a phenyl group) are referred to as silicone resins or silicone alkoxy oligomers and widely used for coating materials, coating agents and binders, utilizing their curability.

Among them, a liquid silicone alkoxy oligomer having an alkoxysilyl group as a cross-linking group is utilized as a main ingredient of a solvent-free type coating material which is combustible and does not contain any organic solvent harmful to the human body.

Further, cross-linking reaction of this alkoxysilyl group proceeds by moisture in air and at room temperature. The alkoxysilyl group in the silicone alkoxy oligomer comprising the alkoxysilyl group reacts, in the presence of a curing catalyst, to form a siloxane network under conditions of room temperature or heating to easily form a coating having superior heat resistance and weatherability, and therefore such silicone alkoxy oligomer is used in a wide range of fields from outdoor buildings to electronic components.

Such a silicone resin or silicone alkoxy oligomer has strong points of good curability and provides a cured coating having high surface hardness because of its three-dimensional cross-linked structure. On the other hand, the coating film causes cracks in some cases by condense of the remaining alkoxysilyl group, after a film formation, over time or when heat is applied from outside.

Patent Literature 1 describes, in order to improve crack resistance, a method in which a molecular weight of the organopolysiloxane is increased and the amount of the alkoxysilyl group contained in a molecule is decreased. In this case, however, an organopolysilsesquioxane becomes solid or more viscous, and when making it into a coating composition, dilution by a solvent is necessary. Patent Literature 2 describes a method in which diorganosiloxane ($R_2SiO_{1.0}$) units (i.e. D units) are incorporated in a synthesis of a silicone resin or silicone alkoxy oligomer in order to improve crack resistance. In this case, however, cross-linked density of organopolysiloxane decreases, and hence there is a problem that the superior surface hardness that is the strong point of the organopolysiloxane may not be obtained.

Non-Patent Literature 1 describes a method of adding a silicone oil capped with a tetraethoxysilane (TEOS) at both terminals of the molecular chain. However, compatibility of the silicone oil with silicone resins or silicone alkoxy oligomers is not good and, thereby, white turbidness or repellency of coating films may be occurred.

PRIOR LITERATURES

Patent Literatures

Patent Literature 1: Japanese Patent Application Laid-Open No. 2007-146031
Patent Literature 2: Japanese Patent Application Laid-Open No. 3-275726

Non-Patent Literature

Non-Patent Literature 1: Polymeric Materials Science and Engineering, 1998, Vol. 79, 192

SUMMARY OF THE INVENTION

Problems to be Solved by the Invention

Further, it is generally essential to add catalysts such as organic metal compounds in the silicone alkoxy oligomer in order to ensure sufficient curability at room temperature. Specifically, the addition of an organic tin-based compound is especially effective. However, toxicity to the human body and environment is a concern with the organic tin-based compound ordinarily used as a catalyst. Environmental regulations have become stricter in recent years and, therefore, the organic tin-based compound has been avoided.

When an organic metal-based catalyst such as the organic tin-based compound is used in a dealcoholization-type room temperature curable composition, there is also a problem that a siloxane bond of a main chain is cut (cracked) by generated alcohol, preservation stability may be poor, such as decrease in curability and increase in viscosity over time.

The present invention has been made in view of the aforementioned circumstances, and one of purposes of the present invention is to provide an organopolysiloxane that has a low viscosity and allows a cured coating to achieve both high hardness and crack resistance, and provide a composition comprising the organopolysiloxane.

Solutions to the Problems

The present inventor has made research to solve the aforesaid problems and found that an organopolysiloxane having a specific constitution provides a cured product that has a low viscosity and allows achieving both high hardness and crack resistance and that a composition comprising this organopolysiloxane is suitable for a curable composition for materials such as a coating agent.

That is, the present invention provides an organopolysiloxane represented by the following average unit formula (1) and having a kinetic viscosity of 10 to 350 mm$^2$/s at 25° C., wherein a proportion (%) of the number of silicon atoms in a unit represented by the following formula (1') to a total number of silicon atoms in all siloxane units of the organopolysiloxane is 10% or less,

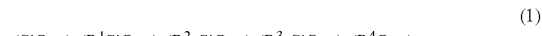

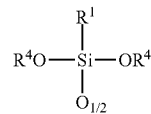

wherein $R^1$, $R^2$, and $R^3$ are independently of each other, an unsubstituted or substituted, cyclic or non-cyclic alkyl group having 1 to 12 carbon atoms that may include an ether bond, or an unsubstituted or substituted aryl group having 6 to 12 carbon atoms, $R^4$ is a hydrogen atom or an alkyl group having 1 to 10 carbon atoms, and a, b, c, d, and e are numbers satisfying the equations $0.2 \geq a \geq 0$, $1 \geq b > 0$, $0.75 \geq c \geq 0$, $0.2 \geq d \geq 0$ and $1 \geq e > 0$, provided that $a+b+c+d=1$.

Effects of the Invention

The organopolysiloxane of the present invention provides a cured coating that achieves both high hardness and crack resistance. Further, the curable composition comprising the organopolysiloxane of the present invention has a low viscosity even without using a solvent and easy to handle, and it can be used appropriately as an environmentally conscious coating agent that does not include a solvent.

DETAILED DESCRIPTION OF THE INVENTION

The present invention is described below in detail. An organopolysiloxane according to the present invention is represented by the following average unit formula (1) and having a kinetic viscosity of 10 to 350 mm²/s at 25° C., wherein a proportion (%) of the number of silicon atoms in a unit represented by the following formula (1') to a total number of silicon atoms in all siloxane units of the organopolysiloxane is 10% or less,

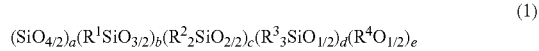
(1)

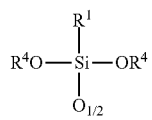
(1')

wherein $R^1$, $R^2$, and $R^3$ are independently of each other, an unsubstituted or substituted, cyclic or non-cyclic alkyl group having 1 to 12 carbon atoms that may include an ether bond, or an unsubstituted or substituted aryl group having 6 to 12 carbon atoms, $R^4$ is a hydrogen atom or an alkyl group having 1 to 10 carbon atoms, and a, b, c, d, and e are numbers satisfying the equations $0.2 \geq a \geq 0$, $1 \geq b > 0$, $0.75 \geq c \geq 0$, $0.2 \geq d \geq 0$ and $1 \geq e > 0$, provided that $a+b+c+d=1$.

The present invention improves crack resistance of a cured coating by reducing the proportion of the constituent unit represented by the structural formula (1') contained in the organopolysiloxane. For the proportion of the constituent unit represented by the structural formula (1), the number of moles of silicon atoms in the constituent unit represented by the formula (1') is 10 mol % or less of the total number of moles of all silicon atoms of the organopolysiloxane, preferably 8 mol % or less, and particularly preferably 6 mol % or less. While it is preferred that a lower limit value is fewer, it may be 0.1 mol % or more, more preferably 0.5 mol % or more, and particularly preferably 1 mol % or more.

$R^1$, $R^2$, and $R^3$ are preferably unsubstituted or substituted, and cyclic or non-cyclic alkyl groups having 1 to 8 carbon atoms that may include an ether bond, or preferably unsubstituted or substituted aryl groups having 6 to 8 carbon atoms. Cyclic or non-cyclic alkyl groups having 1 to 6 carbon atoms that may include an ether bond, or unsubstituted or substituted aryl groups having 6 to 8 carbon atoms are more preferred. In particular, unsubstituted or substituted alkyl groups having 1 to 3 carbon atoms are preferred. Among them, in view of curability and hardness, $R^1$, $R^2$, and $R^3$ are particularly preferably a methyl group, an ethyl group, and a propyl group.

A part or all of hydrogen atoms of these alkyl groups and aryl groups may be substituted with a substituent. The substituent may include a halogen atom, an alkenyl group such as a vinyl group, a glycidyl type epoxy group, an alicyclic epoxy group, a thiirane group (ethylene sulfide group), a (meth)acryloyloxy group, a mercapto group, an iso(thio)cyanate group, a succinic anhydride group, an amino group, an ethylenediamino group, a perfluoroalkyl group, a polyether group such as a polyoxyethylene group, and a perfluoropolyether group. Among them, in view of hardness and crack resistance, a glycidyl type epoxy group, an alicyclic epoxy group, a (meth)acryloyloxy group, a mercapto group, an amino group, a fluoroalkyl group, a vinyl group, and an allyl group are preferred.

$R^4$ is a hydrogen atom or an alkyl group having 1 to 10 carbon atoms, is preferably an alkyl group having 1 to 6 carbon atoms, and may be any of linear, cyclic, or branched. Among them, a linear alkyl group is more preferred. More specifically, examples of a linear alkyl group may include methyl, ethyl, i-propyl, n-propyl, n-butyl, s-butyl, t-butyl, n-pentyl, n-hexyl, n-heptyl, n-octyl, n-nonyl, and n-decyl groups. Methyl, ethyl, i-propyl, n-propyl groups, t-butyl, s-butyl, and n-butyl groups are preferred, and methyl, ethyl, n-propyl, and i-propyl groups are more preferred. In view of curability, a methyl group and an ethyl group are even more preferred.

Two $(R^4O_{1/2})$ units in the structural formula (1) bonds to a silicon atom of T unit represented by $R^1SiO_{3/2}$ in the formula (1). Therefore, in the formula (1), the $(R^1SiO_{3/2})$ unit and the $(R^4O_{1/2})$ unit are essential.

In the formula (1), a, b, c, d, and e are numbers satisfying the equations $0.2 \geq a \geq 0$, $1 \geq b \geq 0$, $0.75 \geq c \geq 0$, $0.2 \geq d \geq 0$, and $1 \geq e > 0$, and satisfy $a+b+c+d=1$. In view of hardness and crack resistance of a cured coating, a, b, c, d, and e are preferably numbers satisfying the equations $a=0$, $1 \geq b > 0.25$, $0.75 \geq c \geq 0$, $d=0$, and $1 \geq e > 0$. Further, a, b, c, d, and e are preferably numbers satisfying the equations $a=0$, $1 \geq b > 0.25$, $0.75 \geq c \geq 0$, $d=0$, and $0.95 \geq e > 0.4$, and particularly preferably $a=0$, $1 \geq b > 0.5$, $0.5 \geq c \geq 0$, $d=0$, and $0.9 \geq e > 0.5$.

In the formula (1), the organopolysiloxane wherein $a=0$ and $d=0$ is represented by the following formula (a).

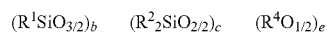

In the formula (a), b, c, and e may be numbers satisfying the equations $1 \geq b > 0.25$, $0.75 \geq c \geq 0$, and $1 \geq e > 0$, preferably $1 \geq b > 0.25$, $0.75 \geq c \geq 0$, and $0.95 \geq e > 0.4$, and more preferably $1 \geq b > 0.5$, $0.5 \geq c \geq 0$, and $0.9 \geq e > 0.5$, and satisfying the equations $b+c=1$. $R^1$, $R^2$ and $R^4$ are as defined above.

a, b, c, d, and e in the organopolysiloxane of the present invention is calculated from peak integral ratios in $^1$H-NMR and $^{29}$Si-NMR spectra.

The organopolysiloxane of the present invention represented by the formula (1) preferably has a structure represented by the following formula (2). Such organopolysiloxane provides further satisfactory hardness and crack resistance of a cured coating.

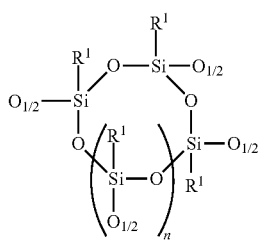

(2)

In the formula (2), $R^1$ is as described above, and n is an integer of from 1 to 3, preferably 1 or 2, and more preferably 1.

The organopolysiloxane of the present invention characterized by having a specific silicon composition and being lowered in viscosity. The organopolysiloxane of the present invention has a kinetic viscosity of 10 to 350 mm²/s. More specifically, 10 to 300 mm²/s is preferred, 10 to 250 mm²/s is more preferred, and in view of workability, 10 to 200 mm²/s is particularly preferred. The kinetic viscosity is a value determined at 25° C. with an Ostwald viscometer.

A method for preparing the organopolysiloxane of the present invention is described below. The organopolysiloxane of the present invention is obtained by the method comprising a step of subjecting a cyclic siloxane represented by the following general formula (3) to hydrolysis and condensation in the presence of an acid catalyst.

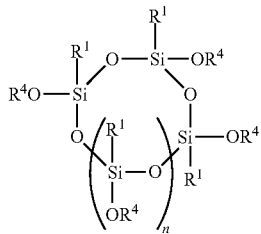

(3)

wherein $R^1$, $R^4$, and n are as described above.

The present method is characterized in that the cyclic siloxane represented by the formula (3) is subjected to the hydrolysis and condensation reaction as a raw material, which allows the amount of units represented by the formula (1') to be 10% or less. In the preparing method of prior art using a methyltrimethoxysilane as a raw material, the amount of the units represented by the formula (1') is increased, so that a cured product obtained has poor crack resistance that is not preferred. Further, as described above, the organopolysiloxane having a structure represented by the formula (2) that is derived from the cyclic siloxane represented by the formula (3) provides further satisfactory hardness and crack resistance of a cured coating.

Examples of the cyclic siloxane represented by the structural formula (3) may preferably include the following cyclic alkoxysilanes.

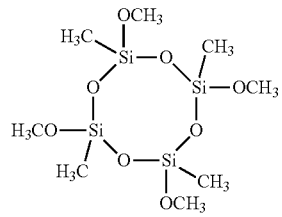

(3A)

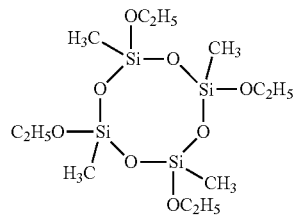

(3B)

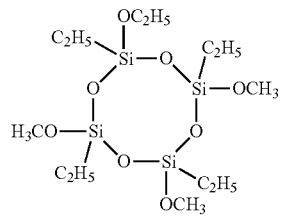

(3C)

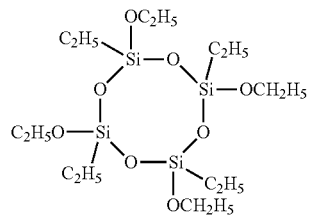

(3D)

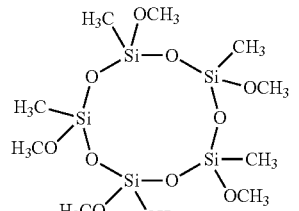

(3E)

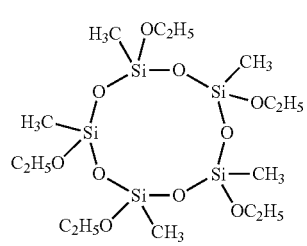

(3F)

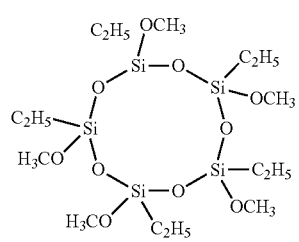

(3G)

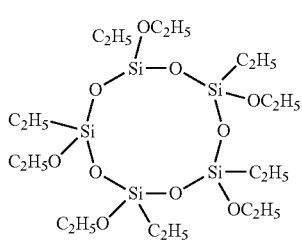

(3H)

The cyclic siloxane represented by the structural formula (3) may be used alone or be used in combination of two or more. Further, one in which these cyclic siloxanes have partially undergone hydrolysis and condensation may be used.

The acid catalyst is not especially limited as long as it has a sufficient degree of acidity to form a siloxane bond by carrying out hydrolysis on an alkoxysilyl group and carrying out dehydration condensation on a generated silanol. The acid catalyst having pKa in a range of −2.9 to 0 is preferred, and a sulfonic acid-based catalyst having pKa in a range of −2.9 to 0 is particularly preferred. On account of the aforementioned hydrolysis and condensation, the organopolysiloxane having a specific composition in the present invention is synthesized.

The acid catalyst may be in any form of a liquid, solid, and gas, and the form is not particularly limited. For example, the acid catalyst may include a substituted or unsubstituted alkyl sulfonic acid having 1 to 14 carbon atoms, a substituted or unsubstituted benzenesulfonic acid having 6 to 30 carbon atoms and hydrate thereof, a substituted or unsubstituted naphthalene sulfonic acid having 6 to 30 carbon atoms and hydrate thereof, a substituted or unsubstituted camphorsulfonic acid, a sulfo group-containing solid acid, and a nitric acid. Among them, a methanesulfonic acid, an ethanesulfonic acid, a camphorsulfonic acid, a p-toluenesulfonic acid, a benzenesulfonic acid, a dinonylnaphthalenedisulfonic acid (DNNDSA), a dinonylnaphthalene(mono) sulfonic acid (DNNSA), and a dodecylbenzenesulfonic acid (DDBSA) are preferred. Further, a methanesulfonic acid, a paratoluensulfonic acid, a benzenesulfonic acid, a dinonylnaphthalenedisulfonic acid (DNNDSA), a dinonylnaphthalene(mono)sulfonic acid (DNNSA), and a dodecylbenzenesulfonic acid (DDBSA) are particularly preferred.

The amount of the acid catalyst is generally preferably 0.001 to 10 mass %, more preferably 0.01 to 5 mass %, and particularly preferably 0.1 to 2.5 mass %, of the total mass of a polymerization reaction system.

The method for preparing the organopolysiloxane of the present invention may be such that cohydrolysis and condensation are carried out on one or more selected from the group consisting of the cyclic siloxane represented by the formula (3) and hydrolysis condensate thereof and one or more selected from the group consisting of a silane represented by the following formula (4) and hydrolysis condensate thereof in the presence of the acid catalyst.

$$R^1_{4-m}Si(OR^4)_m \quad (4)$$

wherein $R^1$ and $R^4$ are as defined in the formula (1), and m is an integer of from 1 to 4.

In the formula (4), examples of the silane wherein in =1 may include trimethylmethoxysilane, trimethylethoxysilane, vinyldimethylmethoxysilane, 3-methacryloxypropyldimethylmethoxysilane, 3-methacryloxypropyldimethylethoxysilane, 3-acryloxypropyldimethylmethoxysilane, 3-acryloxypropyldimethylethoxysilane, N-2-(aminoethyl)-3-aminopropyldimethylmethoxysilane, and N-2-(aminoethyl)-3-aminopropyldimethylethoxysilane.

In the formula (4), examples of the silane wherein m=2 may include dimethyldimethoxysilane, dimethyldiethoxysilane, methylphenyldimethoxysilane, methylphenyldiethoxysilane, diphenyldimethoxysilane, diphenyldiethoxysilane, methylvinyldimethoxysilane, methylvinyldiethoxysilane, octenylmethyldimethoxysilane, 2-(3,4-epoxycyclohexyl)ethylmethyldimethoxysilane, 3-glycidoxypropylmethyldimethoxysilane, 3-glycidoxypropylmethyldiethoxysilane, 3-methaciyloxypropylmethyldimethoxysilane, 3-methacryloxypropylmethyldiethoxysilane, 3-aciyloxypropylmethyldimethoxysilane, N-2-(aminoethyl)-3-aminopropylmethyldimethoxysilane, N-2-(aminoethyl)-3-aminopropylmethyldiethoxysilane, 3-aminopropylmethyldimethoxysilane, 3-aminopropylmethyldiethoxysilane, 3-mercaptopropylmethyldimethoxysilane, 3-mercaptopropylmethyldiethoxysilane, 3-chloropropylmethyldimethoxysilane, and 3-chloropropylmethyldiethoxysilane.

In the formula (4), examples of the silane wherein m=3 may include methyltrimethoxysilane, propyltrimethoxysilane, hexyltrimethoxysilane, octyltrimethoxysilane, decyltrimethoxysilane, phenyltrimethoxysilane, naphtyltrimethoxysilane, vinyltrimethoxysilane, allyltrimethoxysilane, hexenyltrimethoxysilane, octenyltrimethoxysilane, methyltriethoxysilane, propyltriethoxysilane, hexyltriethoxysilane, octyltriethoxysilane, decyltriethoxysilane, phenyltriethoxysilane, naphtyltriethoxysilane, vinyltriethoxysilane, allyltriethoxysilane, hexenyltriethoxysilane, octenyltriethoxysilane, 2-(3,4-epoxycyclohexyl)ethyltrimethoxysilane, 2-(3,4-epoxycyclohexyl)ethyltriethoxysilane, 3-glycidoxypropyltrimethoxysilane, 3-glycidoxypropyltriethoxysilane, 8-glycidoxyoctyltrimethoxysilane, 8-glycidoxyoctyltriethoxysilane, p-styryltrimethoxysilane, p-styryltriethoxysilane, methaciyloxymethyltrimethoxysilane, methacryloxymethyltriethoxysilane, 3-methacryloxypropyltrimethoxysilane, 3-methacryloxypropyltriethoxysilane, 8-methacryloxyoctyltrimethoxysilane, 8-methaciyloxyoctyltriethoxysilane, acryloxymethyltrimethoxysilane, acryloxymethyltriethoxysilane, 3-acryloxypropyltrimethoxysilane, 3-aciyloxypropyltriethoxysilane, 8-acryloxyoctyltrimethoxysilane, 8-acryloxyoctyltriethoxysilane, N-2-(aminoethyl)-aminomethyltrimethoxysilane, N-2-(aminoethyl)-aminomethyltriethoxysilane, N-2-(aminoethyl)-3-aminopropyltrimethoxysilane, N-2-(aminoethyl)-3-aminopropyltriethoxysilane, N-2-(aminoethyl)-8-aminooctyltrimethoxysilane, N-2-(aminoethyl)-8-aminooctyltriethoxysilane, aminomethyltrimethoxysilane, aminomethyltriethoxysilane, 3-aminopropyltrimethoxysilane, 3-aminopropyltriethoxysilane, 8-aminooctyltrimethoxysilane, 8-aminooctyltriethoxysilane, N-phenyl-aminomethyltrimethoxysilane, N-phenyl-aminoethyltrimethoxysilane, N-phenyl-3-aminopropyltrimethoxysilane, N-phenyl-3-aminopropyltriethoxysilane, N-phenyl-8-aminooctyltrimethoxysilane, N-phenyl-8-aminooctyltriethoxysilane, 3-isocyanatopropyltrimethoxysilane, 3-isocyanatopropyltriethoxysilane, mercaptomethyltrimethoxysilane, mercaptomethyltriethoxysilane, 3-mercaptopropyltrimethoxysilane, 3-mercaptopropyltriethoxysilane, 8-mercaptooctyltrimethoxysilane, 8-mercaptooctyltriethoxysilane, 3-trimethoxysilylpropyl succinic anhydride, 3-triethoxysilylpropyl succinic anhydride, chloromethyltrimethoxysilane, chloromethyltriethoxysilane, 3-chloropropyltrimethoxysilane, 3-chloropropyltriethoxysilane, 8-chlorooctyltrimethoxysilane, 8-chlorooctyltriethoxysilane, trifluoropropyltrimethoxysilane, nonafluorohexyltrimethoxysilane, tridecafluorooctyltrimethoxysilane, polyethylene glycol methyl-3-trimethoxysilylpropyl ether, polyethylene glycol methyl-3-triethoxysilylpropyl ether, polypropylene glycol methyl-3-trimethoxysilylpropyl ether, and polypropylene glycol methyl-3-triethoxysilylpropyl ether.

In the formula (4), examples of the silane wherein n=4 may include tetramethoxysilane, tetraethoxysilane, tetrapropoxysilane, tetraisopropoxysilane, tetrabutoxysilane, and tetraoctoxysilane.

Among them, the silane wherein m=2 or m=3 is preferred. Preferable example of the silane wherein m=2 is dimethyldimethoxysilane, dimethyldiethoxysilane, diphenyldimethoxysilane, methylvinyldimethoxysilane, methylvinyldiethoxysilane, 3-glycidoxypropylmethyldimethoxysilane, 3-glycidoxypropylmethyldiethoxysilane. Dimethyldimethoxysilane and dimethyldiethoxysilane are more preferred. Preferable example of the silane wherein i=3 is methyltrimethoxysilane, methyltriethoxysilane, vinyltrimethoxysilane, phenyltrimethoxysilane, 3-glycidoxypropyltrimethoxysilane, 3-glycidoxypropyltriethoxysilane, 3-methacryloxypropyltrimethoxysilane, 3-acryloxypropyltrimethoxysilane, 3-mercaptopropyltrimethoxysilane, 3-mercaptopropyltriethoxysilane, nonafluorohexyltrimethoxysilane, tridecafluorooctyltrimethoxysilane, and polyethylene glycol methyl-3-trimethoxysilylpropyl ether. Methyltrimethoxysilane and methyltriethoxysilane are more preferred.

The silane wherein m=2 or m=3 reacts with a compound represented by the formula (3) to obtain the organopolysiloxane represented by the following formula (a) which is the compound represented by the aforesaid formula (1) and a is 0 and d is 0.

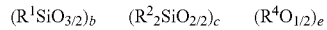

(a)

$(R^1SiO_{3/2})_b$  $(R^2_2SiO_{2/2})_c$  $(R^4O_{1/2})_e$

In the formula (a), b, c, e, $R^1$, $R^2$ and $R^4$ are as described above.

The silane represented by the formula (4) may be used alone or in combination of two or more kinds. Further, a partially hydrolysis and condensation compound of the aforesaid silane may be used.

In the method for preparing the polysiloxane of the present invention, while the hydrolysis and condensation reaction may be carried out without a solvent, but a solvent may be used. As a solvent, for example, an organic solvent, such as methanol, ethanol, isopropyl alcohol, butanol, diacetone alcohol, propylene glycol monomethyl ether, propylene glycol monomethyl ether acetate, acetone, toluene, and xylene, may be used. When an organic solvent is used, the amount of the organic solvent is not particularly limited, but is preferably 20 parts by mass or less, more preferably 0.25 to 10 parts by mass, and further preferably 0.5 to 5 parts by mass, relative to one part by mass of the total of the silane and the siloxane.

The acid catalyst and water are added to the cyclic siloxane represented by the formula (3), and an optional mixture or solution of the silane represented by the formula (4) if necessary, to proceed the copolymerization by hydrolysis and condensation. The acid catalyst in an aqueous solution may be used.

The amount of water used for the reaction is generally preferably 0.025 to 5.0 mol, more preferably 0.05 to 2.5 mol, and even more preferably 0.075 to 1.0 mol, relative to one mol of an alkoxysilyl group in the reaction system.

A reaction temperature is not particularly limited, but is generally 0 to 150° C., preferably 20 to 120° C., more preferably 40 to 100° C., and even more preferably 50 to 80° C. A reaction time is generally 1 hour or more, and preferably 2 to 72 hours.

It is preferred that an alcohol by-produced in the hydrolysis and condensation reaction of the alkoxysilyl group, unreacted raw materials, and a low molecular siloxane are removed by a distillation operation. The temperature and pressure are not particularly limited as long as these impurities are removed. The distillation operation may be carried out generally at 10 to 150° C., preferably at 60 to 120° C., under an atmospheric pressure or a reduced pressure.

Curable Composition

The present invention further provides a curable composition comprising the organopolysiloxane (A) and a curing catalyst (B). The curable composition comprising the organopolysiloxane of the present invention has a low viscosity and is superior in workability even without using a solvent and, therefore, the curable composition is suitable as a coating agent. Further, a coating obtained by curing the curable composition of the present invention is superior in hardness and crack resistance.

The curing catalyst (B) is not particularly limited and any curing catalyst for a general moisture condensation curing-type composition may be used. Examples of the curing catalyst may include alkyl tin compounds, such as dibutyltin oxide and dioctyltin oxide; alkyl tin ester compounds such as dibutyltin diacetate, dibutyltin dilaurate, dioctyltin dilaurate, dibutyltin dioctoate, dioctyltin dioctoate, and dioctyltin diversate; titanic acid ester, such as tetraisopropoxy titanium, tetra-n-butoxy titanium, tetrakis(2-ethylhexoxy)titanium, tetra-t-butoxy titanium, dipropoxybis(acetylacetonato)titanium, titanium diisopropoxybis(ethyl acetoacetate), and titanium isopropoxy octylene glycol, and titanium chelate compounds and partially hydrolysates thereof; aluminum compounds such as zinc naphthenate, zinc stearate, zinc-2-ethyloctoate, iron-2-ethylhexoate, cobalt-2-ethylhexoate, manganese-2-ethylhexoate, cobalt naphthenate, acetylacetone aluminum, aluminum bis(ethyl acetoacetate) mononormal butyrate, aluminum ethyl acetoacetate dinormal butyrate, and aluminum tris(ethyl acetoacetate), and hydrolysates thereof; aminoalkyl group-substituted alkoxysilanes such as 3-aminopropyltrimethoxysilane, 3-aminopropyltriethoxysilane, 3-aminopropylmethyldimethoxysilane, 3-aminopropylmethyldiethoxysilane, N-β(aminoethyl)γ-aminopropyltrimethoxysilane, N-β(aminoethyl)γ-aminopropyltriethoxysilane, N-β(aminoethyl)γ-aminopropylmethyldimethoxysilane, N-β(aminoethyl)γ-aminopropylmethyldiethoxysilane, bis[3-(trimethoxysilyl)propyl]amine, bis[3-(triethoxysilyl)propyl]amine, N,N'-bis[3-(trimethoxysilyl)propyl]ethane-1,2-diamine, N,N'-bis[3-(triethoxysilyl)propyl]ethane-1,2-diamine, and N-phenyl-3-aminopropyltrimethoxysilane; amine compounds such as hexylamine, dodecylamine phosphate, and tetramethylguanidine, and salts thereof; quaternary ammonium salts such as benzyltriethylammonium acetate; alkali metal lower fatty acid salts such as potassium acetate, sodium acetate, and lithium oxalate; dialkylhydroxylamines such as dimethylhydroxylamine and diethylhydroxylamine; silanes and siloxanes comprising a guanidyl group, such as tetramethylguanidylpropyltrimethoxysilane, tetramethylguanidylpropylmethyldimethoxysilane, tetramethylguanidylpropyltriethoxysilane, tetramethylguanidylpropylmethyldiethoxysilane, and tetramethylguanidylpropyltris(trimethylsiloxy)silane; silanes and siloxanes comprising a phosphazene base, such as N,N,N',N',N'',N''-hexamethyl-N'''-[3-(trimethoxysilyl)propyl]-phosphorimidic triamide; Brønsted acids, such as hydrochloric acid, methanesulfonic acid, camphorsulfonic acid, p-toluenesulfonic acid, benzenesulfonic acid, dinonylnaphthalenedisulfonic acid (DNNDSA), dinonylnaphthalene(mono)sulfonic acid (DNNSA), dodecylbenzenesulfonic acid (DDBSA), phosphoric acid, and nitric acid.

Among them, in view of superior reactivity, preferred are tin compounds such as dioctyltin dilaurate and dioctyltin diversate; titanium compounds such as tetraisopropoxy titanium, tetra-n-butoxy titanium, tetra-t-butoxy titanium, and titanium diisopropoxy bis(ethyl acetoacetate) and hydrolysates thereof; aluminum compounds such as acetylacetone aluminum, aluminum bis(ethyl acetoacetate) mononormal butyrate, aluminum ethyl acetoacetate dinormal butyrate, and aluminum tris(ethyl acetoacetate), and hydrolysates thereof; amine compounds such as 3-aminopropyltrimethoxysilane, 3-aminopropyltriethoxysilane, N-β(aminoethyl)γ-aminopropyltrimethoxysilane, bis[3-(trimethoxysilyl)propyl]amine, N,N'-bis[3-(trimethoxysilyl)propyl]ethane-1,2-diamine, and tetramethylguanidylpropyltrimethoxysilane; and Brønsted acids such as methanesulfonic acid, camphorsulfonic acid, p-toluenesulfonic acid, benzenesulfonic acid, dinonylnaphthalenedisulfonic acid (DNNDSA), dinonylnaphthalene(mono)sulfonic acid (DNNSA), dodecylbenzenesulfonic acid (DDBSA), phosphoric acid, and nitric acid. In view of curability of a composition, more preferred are dioctyltin dilaurate, dioctyltin diversate, tetra-n-butoxy titanium, tetra-t-butoxy titanium, acetylacetone aluminum, aluminum bis(ethyl acetoacetate) mononormal butyrate, aluminum ethyl acetoacetate dinormal butyrate, aluminum tris (ethyl acetoacetate), 3-aminopropyltrimethoxysilane, 3-aminopropyltriethoxysilane, tetramethylguanidylpropyltrimethoxysilane, methanesulfonic acid, camphorsulfonic acid, p-toluenesulfonic acid, benzenesulfonic acid, dinonylnaphthalenedisulfonic acid (DNNDSA), dinonylnaphthalene(mono)sulfonic acid (DNNSA), and dodecylbenzenesulfonic acid (DDBSA). In view of having low toxicity because of not comprising organic tin-based compounds, tetra-n-butoxy titanium, tetra-t-butoxy titanium, acetylacetone aluminum, aluminum bis(ethyl acetoacetate) mononormal butyrate, aluminum ethyl acetoacetate dinormal butyrate, aluminum tris(ethyl acetoacetate), 3-aminopropyltrimethoxysilane, 3-aminopropyltriethoxysilane, tetramethylguanidylpropyltrimethoxysilane, methanesulfonic acid, camphorsulfonic acid, p-toluenesulfonic acid, benzenesulfonic acid, dinonylnaphthalenedisulfonic acid (DNNDSA), dinonylnaphthalene(mono)sulfonic acid (DNNSA), dodecylbenzenesulfonic acid (DDBSA), and phosphoric acid are even more preferred. In view of curability of a composition, tetra-n-butoxy titanium, tetra-t-butoxy titanium, aluminum bis(ethyl acetoacetate) mononormal butyrate, aluminum ethyl acetoacetate dinormal butyrate, aluminum tris(ethyl acetoacetate), tetramethylguanidylpropyltrimethoxysilane, methanesulfonic acid, camphorsulfonic acid, p-toluenesulfonic acid, benzenesulfonic acid, dinonylnaphthalenedisulfonic acid (DNNDSA), dinonylnaphthalene(mono)sulfonic acid (DNNSA), and dodecylbenzenesulfonic acid (DDBSA) are particularly preferred. These may be used alone or in combination of two or more.

An amount of the curing catalyst (B) is not particularly limited. A curing rate may be adjusted in an appropriate range to provide a cured coating having desired physical properties, to improve workability during coating and, further, economic efficiency in association with the addition. The amount is preferably 0.001 to 50 parts by mass, more preferably 0.05 to 40 parts by mass, and even more preferably 0.1 to 30 parts by mass, relative to 100 parts by mass of component (A).

For the purpose of adjusting viscosity of the curable composition of the present invention to improve the workability and for the purpose of adjusting curability of the composition and adjusting hardness, flexibility and adhesion of the coating film obtained, an organopolysiloxane or a silane compound other than the component (A) may be added.

In the curable composition of the present invention, from the aspect of use and workability, an organic solvent may be used. The organic solvent is such as methanol, ethanol, isopropyl alcohol, butanol, diacetone alcohol, propylene glycol monomethyl ether, propylene glycol monomethyl ether acetate, acetone, toluene, and xylene. The curable composition preferably does not substantially contain the organic solvent which is often harmful to the human body and often has combustibility. Here, "not substantially contain" means that the amount of the organic solvent contained in the composition is 1 part by mass or less and particularly 0.1 parts by mass or less.

The curable composition of the present invention may contain any additive appropriately within a range that does not hinder the effects of the present invention. Examples of the additive may include an adhesion improver, an inorganic or organic ultraviolet-light absorber, a light stabilizer, a storage stability improver, a plasticizer, a filler, and a pigment.

The coating agent comprising the curable composition of the present invention is coated on a surface of a substrate and cured to obtain an article having a coated layer composed of a cured product. A method for coating the coating agent is not particularly limited. For example, the coating method may be appropriately selected from known methods such as spray coating, spin coating, dip coating, roller coating, brush coating, bar coating, and flow coating.

A substrate may include organic polymer substrates such as epoxy resins, phenol resins, polycarbonates and polycarbonate blends, acrylic resins such as poly(methyl methacrylate), polyester resins such as poly(ethylene terephthalate), poly(butylene terephthalate), and unsaturated polyester resins, polyamide resins, polyimide resins, acrylonitrile-styrene copolymers, styrene-acrylonitrile-butadiene copolymers, polyvinylchloride resins, polystyrene resins, a blend of polystyrene and polyphenylene ether, cellulose acetate butyrate, and polyethylene resins, metal substrates such as steel plates, surfaces coated with a coating material, glass, ceramics, concretes, slate plates, textiles, wood, building stone, roofing tiles, inorganic fillers such as hollow silicas, titania, zirconia, and alumina, and glass fiber products such as glass cloth including glass fibers, glass tapes, glass mats, and glass paper. While the material and shape of the substrate are not particularly limited, the curable composition of the present invention may be used particularly appropriate for coating of steel plates and glasses.

The curable composition of the present invention is contacted with water in an atmosphere and, thereby, hydrolysis and condensation of the organopolysiloxane (A) and a curing reaction are conducted. As an index of the water in the atmosphere may be any humidity of from 10 to 100% RH, and moisture in air is sufficient. The hydrolysis generally proceeds faster as humidity is high. Therefore, the water may be added into the atmosphere if desired. A curing reaction temperature and time may be appropriately changed according to factors, such as a substrate used, a water concentration, a catalyst concentration, and a type of a hydrolysable group. The curing temperature is preferably −10 to 200° C., and particularly preferably 0 to 150° C. The curing time is generally around one minute to one week within a range in which a heat resisting temperature of the substrate used is not exceeded. The composition of the present invention proceeds curing well even at room temperature. Therefore, especially even when curing at room temperature is required at in situ application, stickiness (tack) of the surface of the coating film is eliminated in a few minutes to a few hours, and the composition of the present invention is superior in workability. A heat treatment may be carried out within a range in which the heat resisting temperature of the substrate is not exceeded.

EXAMPLES

The present invention will be explained below in further detail with reference to a series of the Examples and the Comparative Examples, though the present invention is in no way limited by these Examples.

In the following description, the kinetic viscosity of each product is a determined value at 25° C. with an Ostwald viscometer. A silicone average composition shown as a ratio of a constituent unit, was determined with a 300 MHz NMR measuring instrument ex JEOL Ltd., and calculated from integrated values of detection spectra in $^1$H-NMR and $^{29}$Si-NMR. The pencil hardness was determined with a weight load of 750 g according to the Japanese Industrial Standards (JIS) K 5600-5-4.

In the following, the proportion (%) of the constituent unit represented by the formula (1') is a proportion (%) of the number of silicon atoms in the formula (1') unit to the number of silicon atoms in all siloxane units that an organosiloxane has.

[1] Synthesis of Cyclic Alkoxysiloxane

Synthesis Example 1

In accordance with the procedures of Example 26 in the paragraph 00104 described in WO 2007/140012, 2,4,6,8-tetramethoxy-2,4,6,8-tetramethylcyclotetrasiloxane represented by the following formula (3A) was synthesized.

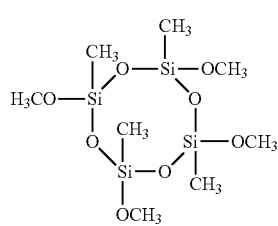

(3A)

[2] Preparation of Organopolysiloxane

Example 1

Preparation of Organopolysiloxane 1

In a 1,000 mL separable flask equipped with a stirrer, a reflux condenser, a dropping funnel, and a thermometer, were put 361 g of the cyclic alkoxysiloxane represented by the formula (3A), which was obtained in Synthesis Example 1, and 361 g of toluene and, then, was added 3.6 g of methanesulfonic acid while stirring. Subsequently, 9.0 g of ion exchanged water was added dropwise thereto over one hour. After the dropping, polymerization was carried out at 25° C. for two hours. The reaction solution obtained was provided with 18.0 g of Kyowaad 500SN (ex Kyowa Chemical Industry Co., Ltd.) and stirred at 25° C. for two hours to be neutralized and, then, remaining methanol and low molecular components were removed by distillation under reduced pressure to obtain organopolysiloxane 1.

The kinetic viscosity of organopolysiloxane 1 thus obtained was 20 mm$^2$/s. Organopolysiloxane 1 obtained is represented by the following average unit formula (a1). The ratios of the respective constituent units were, based on calculation from the results of Si-NMR measurement, b=1, c=0, and e=0.72, and the proportion of the constituent unit represented by the following formula (1') was 1.5%.

The cyclic compound of the raw material did not remain and the unit of the formula (1') was not produced and, that is, the cyclic compound was not cleaved. Organopolysiloxane 1 obtained had a constituent unit represented by the following structural formula (8), which was derived from the cyclic alkoxysiloxane as the raw material.

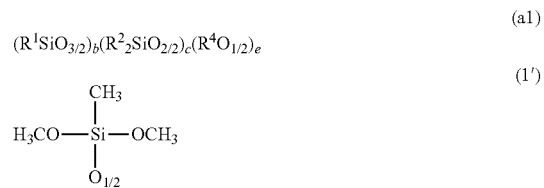

In the formula (a1), R$^1$ and R$^4$ are methyl groups.

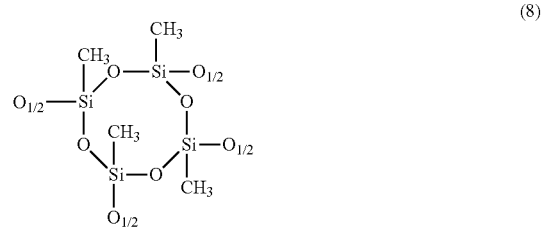

Example 2

Preparation of Organopolysiloxane 2

The procedures in Example 1 were repeated except that the amount of ion exchanged water was changed to 13.5 g to obtain organopolysiloxane 2. The kinetic viscosity of organopolysiloxane 2 thus obtained was 49 mm$^2$/s. Organopolysiloxane 2 obtained was represented by the average unit formula (a1). The ratios of the respective constituent units were b=1, c=0, and e=0.64 from Si-NMR measurement, and the proportion of the constituent unit represented by the formula (1') was 1.0 mol %.

The cyclic compound of the raw material did not remain and the unit of the formula (1') was not produced, that is, the cyclic compound was not cleaved. Organopolysiloxane 2 obtained had the constituent unit represented by the structural formula (8), which was derived from the cyclic alkoxysiloxane as the raw material.

Example 3

Preparation of Organopolysiloxane 3

In a 1,000 mL separable flask equipped with a stirrer, a reflux condenser, a dropping funnel, and a thermometer, were put 361 g of the cyclic alkoxysiloxane represented by the formula (3A), which was obtained in Synthesis Example 1, and 361 g of toluene and, then, was added 3.6 g of methanesulfonic acid while stirring. Subsequently, 9.0 g of ion exchanged water was added dropwise thereto over one hour. After the dropping, by-produced methanol was removed by distillation at 67° C. under an atmospheric pressure. The reaction solution obtained was provided with 18.0 g of Kyowaad 500SN (ex Kyowa Chemical Industry Co., Ltd.) and stirred at 25° C. for two hours to be neutralized and, then, remaining methanol and low molecular components were removed by distillation under reduced pressure to obtain organopolysiloxane 3.

The kinetic viscosity of organopolysiloxane 3 thus obtained was 71 mm²/s. Organopolysiloxane 3 obtained is represented by the average unit formula (a1). The ratios of the respective constituent units were b=1, c=0 and e=0.62 from Si-NMR measurement, and the proportion of the constituent unit represented by the formula (1') was 4.4 mol %.

The cyclic compound of the raw material did not remain and the unit of the formula (1) was not produced, that is, the cyclic compound was not cleaved. Organopolysiloxane 3 obtained had the constituent unit represented by the structural formula (8), which was derived from the cyclic alkoxysiloxane as the raw material.

Example 4

Preparation of Organopolysiloxane 4

In a 1,000 mL separable flask equipped with a stirrer, a reflux condenser, a dropping funnel, and a thermometer, were put 324 g of the cyclic alkoxysiloxane represented by the structural formula (3A), which was obtained in Synthesis Example 1, 48 g of dimethyldimethoxysilane, and 372 g of toluene and, then, was added 3.6 g of methanesulfonic acid while stirring. Subsequently, 12.0 g of ion exchanged water was added dropwise thereto over one hour. After the dropping, polymerization was carried out at 25° C. for two hours. The reaction solution obtained was provided with 18.0 g of Kyowaad 500SN (ex Kyowa Chemical Industry Co., Ltd.) and stirred at 25° C. for two hours to be neutralized and, then, remaining methanol and low molecular components were removed by distillation under reduced pressure to obtain organopolysiloxane 4.

The kinetic viscosity of organopolysiloxane 4 thus obtained was 40 mm²/s. Organopolysiloxane 4 obtained is represented by the following average unit formula (a2). The ratios of the respective constituent units were b=0.91, c=0.09, and e=0.72 from Si-NMR measurement, and the proportion of the constituent unit represented by the structural formula (1') was 5.3 mol %.

The cyclic compound of the raw material did not remain and the unit of the formula (1) was not produced, that is, the cyclic compound was not cleaved. Organopolysiloxane 4 obtained had the constituent unit represented by the structural formula (8), which was derived from the cyclic alkoxysiloxane as the raw material.

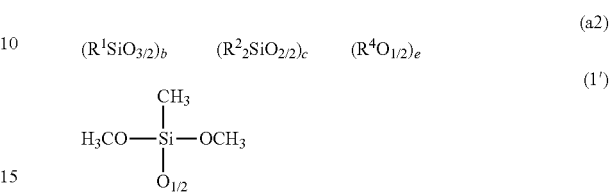

In the formula (a2), $R^1$, $R^2$, and $R^4$ are a methyl group.

Example 5

Preparation of Organopolysiloxane 5

In a 1,000 mL separable flask equipped with a stirrer, a reflux condenser, a dropping funnel, and a thermometer, were put 289 g of the cyclic alkoxysiloxane represented by the formula (3A), which was obtained in Synthesis Example 1, 96 g of dimethyldimethoxysilane, and 385 g of toluene and, then, was added 4.0 g of methanesulfonic acid while stirring. Subsequently, 13.0 g of ion exchanged water was added dropwise thereto over one hour. After the dropping, polymerization was carried out at 25° C. for two hours. The reaction solution obtained was provided with 20.0 g of Kyowaad 500SN (ex Kyowa Chemical Industry Co., Ltd.) and stirred at 25° C. for two hours to be neutralized and, then, remaining methanol and low molecular components were removed by distillation under reduced pressure to obtain organopolysiloxane 5.

The kinetic viscosity of organopolysiloxane 5 thus obtained was 31 mm²/s. Organopolysiloxane 5 obtained is represented by the average unit formula (a2). The ratios of the respective constituent units were b=0.84, c=0.16, and e=0.81 from Si-NMR measurement, and the proportion of the constituent unit represented by the formula (1') was 2.9 mol %.

The cyclic compound of the raw material did not remain and the unit of the formula (1') was not produced, that is, the cyclic compound was not cleaved. Organopolysiloxane 5 obtained had the constituent unit represented by the structural formula (8), which was derived from the cyclic alkoxysiloxane as the raw material.

Example 6

Preparation of Organopolysiloxane 6

In a 1,000 mL separable flask equipped with a stirrer, a reflux condenser, a dropping funnel, and a thermometer, were put 325 g of the cyclic alkoxysiloxane represented by the formula (3A), which was obtained in Synthesis Example 1, 99 g of 3-(methacryloyloxy)propyltrimethoxysilane, and 424 g of toluene and, then, was added 4.2 g of methanesulfonic acid while stirring. Subsequently, 13.0 g of ion exchanged water was added dropwise thereto over one hour. After the dropping, polymerization was carried out at 25° C. for two hours. The reaction solution obtained was provided with 21.2 g of Kyowaad 500SN (ex Kyowa Chemical Industry Co., Ltd.) and stirred at 25° C. for two hours to be neutralized and, then, remaining methanol and low molecular components were removed by distillation under reduced pressure to obtain organopolysiloxane 6.

The kinetic viscosity of organopolysiloxane 6 thus obtained was 42 mm²/s. Organopolysiloxane 6 obtained is represented by the average unit formula (a3). The ratios of the respective constituent units were b=1.0, c=0, and e=0.62 from Si-NMR measurement, and the proportion of the constituent unit represented by the formula (1) was 5.4 mol %.

The cyclic compound of the raw material did not remain and the unit of the formula (1') is not produced, that is, the cyclic compound is not cleaved. Organopolysiloxane 6 obtained has the constituent unit represented by the structural formula (8), which is derived from the cyclic alkoxysiloxane as the raw material.

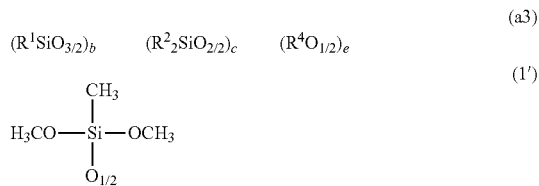

(a3)

(1')

In the formula (a3), $R^1$ is a methyl group or a 3-(methacryloyloxy)propyl group, and $R^4$ is a methyl group.

Example 7

Preparation of Organopolysiloxane 7

In a 1,000 mL separable flask equipped with a stirrer, a reflux condenser, a dropping funnel, and a thermometer, were put 325 g of the cyclic alkoxysiloxane represented by the formula (3A), which was obtained in Synthesis Example 1, 87 g of 3-(methacryloyloxy)propylmethyldimethoxysilane, and 424 g of toluene, and, then, was added 4.2 g of methanesulfonic acid while stirring. Subsequently, 11.8 g of ion exchanged water was added dropwise thereto over one hour. After the dropping, polymerization was carried out at 25° C. for two hours. The reaction solution obtained was provided with 20.6 g of Kyowaad 500SN (ex Kyowa Chemical Industry Co., Ltd.) and stirred at 25° C. for two hours to be neutralized and, then, remaining methanol and low molecular components were removed by distillation under reduced pressure to obtain organopolysiloxane 7.

The kinetic viscosity of organopolysiloxane 7 thus obtained was 41 mm²/s. Organopolysiloxane 7 obtained is represented by the following average unit formula (a4). The ratios of the respective constituent units were b=0.91, c=0.09, and e=0.69 from Si-NMR measurement, and the proportion of the constituent unit represented by the formula (1') was 2.3 mol %. The cyclic compound of the raw material did not remain and the unit of the formula (1) was not produced, that is, the cyclic compound was not cleaved. Organopolysiloxane 7 obtained had the constituent unit represented by the structural formula (8), which was derived from the cyclic alkoxysiloxane as the raw material.

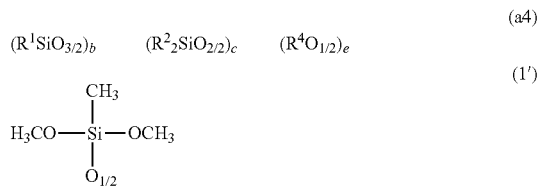

(a4)

(1')

In the formula (a4), $R^1$ is a methyl group, $R^2$ is a methyl group or a 3-(methacryloyloxy)propyl group, and $R^4$ is a methyl group.

Example 8

Preparation of Organopolysiloxane 8

In a 1,000 mL separable flask equipped with a stirrer, a reflux condenser, a dropping funnel, and a thermometer, were put 325 g of the cyclic alkoxysiloxane represented by the formula (3A), which was obtained in Synthesis Example 1, 94 g of 3-glycidyloxypropyltrimethoxysilane, and 419 g of toluene and, then, was added 4.2 g of methanesulfonic acid while stirring. Subsequently, 13.0 g of ion exchanged water was added dropwise thereto over one hour. After the dropping, polymerization was carried out at 25° C. for two hours. The reaction solution obtained was provided with 21.0 g of Kyowaad 500SN (ex Kyowa Chemical Industry Co., Ltd.) and stirred at 25° C. for two hours to be neutralized and, then, remaining methanol and low molecular components were removed by distillation under reduced pressure to obtain organopolysiloxane 8.

The kinetic viscosity of organopolysiloxane 8 thus obtained was 51 mm²/s. Organopolysiloxane 8 obtained is represented by the following average unit formula (a5). The ratios of the respective constituent units were b=1.0, c=0, and e=0.65 from Si-NMR measurement, and the proportion of the constituent unit represented by the structural formula (1') was 4.9 mol %. The cyclic compound of the raw material does not remain and the unit of the formula (1') is not produced, that is, the cyclic compound is not cleaved. Organopolysiloxane 8 obtained has the constituent unit represented by the structural formula (8), which is derived from the cyclic alkoxysiloxane as the raw material.

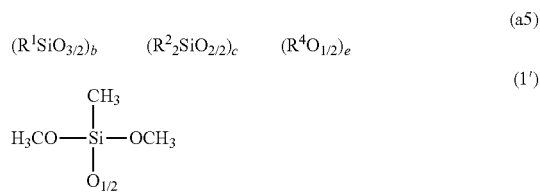

(a5)

(1')

In the formula (a5), $R^1$ is a methyl group or a 3-glycidyloxypropyl group, and $R^4$ is a methyl group.

Example 9

Preparation of Organopolysiloxane 9

In a 1,000 mL separable flask equipped with a stirrer, a reflux condenser, a dropping funnel, and a thermometer, were put 325 g of the cyclic alkoxysiloxane represented by the formula (3A), which was obtained in Synthesis Example 1, 88 g of 3-glycidyloxypropylmethyldimethoxysilane, and 413 g of toluene and, then, was added 4.1 g of methanesulfonic acid while stirring. Subsequently, 11.9 g of ion exchanged water was added dropwise thereto over one hour. After the dropping, polymerization was carried out at 25° C. for two hours. The reaction solution obtained was provided with 20.6 g of Kyowaad 500SN (ex Kyowa Chemical Industry Co., Ltd.) and stirred at 25° C. for two hours to be neutralized and, then, remaining methanol and low molecular components were removed by distillation under reduced pressure to obtain organopolysiloxane 9.

The kinetic viscosity of organopolysiloxane 9 thus obtained was 45 mm$^2$/s. Organopolysiloxane 9 obtained is represented by the following average unit formula (a6). The ratios of the respective constituent units were b=0.9, c=0.1, and e=0.67 from Si-NMR measurement, and the proportion of the constituent unit represented by the structural formula (1') was 4.3 mol %. The cyclic compound of the raw material did not remain and the unit of the formula (1') was not produced, that is, the cyclic compound was not cleaved. Organopolysiloxane 9 obtained had the constituent unit represented by the structural formula (8), which was derived from the cyclic alkoxysiloxane as the raw material.

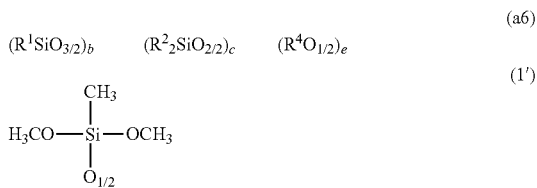

In the formula (a6), $R^1$ is a methyl group, $R^2$ is a 3-glycidyloxypropyl group or a methyl group, and $R^4$ is a methyl group.

Example 10

Preparation of Organopolysiloxane 10

In a 1,000 mL separable flask equipped with a stirrer, a reflux condenser, a dropping funnel, and a thermometer, were put 325 g of the cyclic alkoxysiloxane represented by the formula (3A), which was obtained in Synthesis Example 1, 78 g of 3-mercaptopropyltrimethoxysilane, and 403 g of toluene and, then, was added 4.0 g of methanesulfonic acid while stirring. Subsequently, 13.0 g of ion exchanged water was added dropwise thereto over one hour. After the dropping, polymerization was carried out at 25° C. for two hours. The reaction solution obtained was provided with 20.2 g of Kyowaad 500SN (ex Kyowa Chemical Industry Co., Ltd.) and stirred at 25° C. for two hours to be neutralized and, then, remaining methanol and low molecular components were removed by distillation under reduced pressure to obtain organopolysiloxane 10.

The kinetic viscosity of organopolysiloxane 10 thus obtained was 66 mm$^2$/s. Organopolysiloxane 10 obtained is represented by the following average unit formula (a7). The ratios of the respective constituent units were b=1.0, c=0, and e=0.63 from Si-NMR measurement, and the proportion of the constituent unit represented by the formula (1') was 5.3 mol %. The cyclic compound of the raw material does not remain and the unit of the formula (1') is not produced, that is, the cyclic compound is not cleaved. Organopolysiloxane 10 obtained has the constituent unit represented by the structural formula (8), which is derived from the cyclic alkoxysiloxane as the raw material.

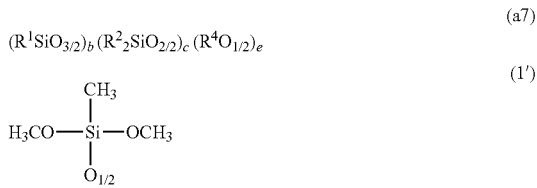

In the formula (a7), $R^1$ is a methyl group or a 3-mercaptopropyl group, and $R^4$ is a methyl group.

Example 11

Preparation of Organopolysiloxane 11

In a 1,000 mL separable flask equipped with a stirrer, a reflux condenser, a dropping funnel, and a thermometer, were put 325 g of the cyclic alkoxysiloxane represented by the formula (3A), which was obtained in Synthesis Example 1, 59 g of vinyltrimethoxysilane, and 384 g of toluene and, then, was added 3.8 g of methanesulfonic acid while stirring. Subsequently, 13.0 g of ion exchanged water was added dropwise thereto over one hour. After the dropping, polymerization was carried out at 25° C. for two hours. The reaction solution obtained was provided with 19.2 g of Kyowaad 500SN (ex Kyowa Chemical Industry Co., Ltd.) and stirred at 25° C. for two hours to be neutralized and, then, remaining methanol and low molecular components were removed by distillation under reduced pressure to obtain organopolysiloxane 11.

The kinetic viscosity of organopolysiloxane 11 thus obtained was 38 mm$^2$/s. Organopolysiloxane 11 obtained is represented by the following average unit formula (a8). The ratios of the respective constituent units were b=1.0, c=0, and e=0.57 from Si-NMR measurement, and the proportion of the constituent unit represented by the structural formula (1) was 2.9 mol %. The cyclic compound of the raw material did not remain and the unit of the formula (1') was not produced, that is, the cyclic compound was not cleaved. Organopolysiloxane 11 obtained had the constituent unit represented by the structural formula (8), which was derived from the cyclic alkoxysiloxane as the raw material.

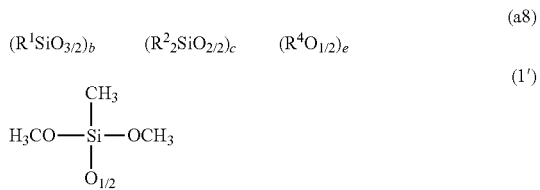

In the formula (a8), $R^1$ is a methyl group or a vinyl group, and $R^4$ is a methyl group.

Example 12

Preparation of Organopolysiloxane 12

In a 1,000 mL separable flask equipped with a stirrer, a reflux condenser, a dropping funnel, and a thermometer, were put 325 g of the cyclic alkoxysiloxane represented by the structural formula (3A), which was obtained in Synthesis Example 1, 72 g of 3-aminopropyltrimethoxysilane, and 397 g of toluene and, then, was added 4.0 g of methanesulfonic acid while stirring. Subsequently, 13.0 g of ion exchanged water was added dropwise thereto over one hour. After the dropping, polymerization was carried out at 25° C. for two hours. The reaction solution obtained was provided with 19.8 g of Kyowaad 500SN (ex Kyowa Chemical Industry Co., Ltd.) and stirred at 25° C. for two hours to be neutralized and, then, remaining methanol and low molecular components were removed by distillation under reduced pressure to obtain Organopolysiloxane 12.

The kinetic viscosity of organopolysiloxane 12 thus obtained was 61 mm$^2$/s. Organopolysiloxane 12 obtained is represented by the average unit formula (a1). The ratios of the respective constituent units were b=1.0, c=0, and e=0.59 from Si-NMR measurement, and the proportion of the constituent unit represented by the formula (1') was 5.2 mol %. The cyclic compound of the raw material did not remain and the unit of the formula (1) was not produced, that is, the cyclic compound was not cleaved. Organopolysiloxane 12 obtained had the constituent unit represented by the structural formula (8), which was derived from the cyclic alkoxysiloxane as the raw material.

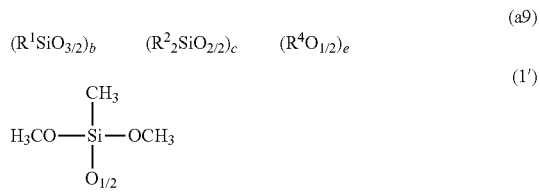

In a formula (a9), $R^1$ is a methyl group or a 3-aminopropyl group, and $R^4$ is a methyl group.

Example 13

Preparation of Organopolysiloxane 13

In a 1,000 mL separable flask equipped with a stirrer, a reflux condenser, a dropping funnel, and a thermometer, were put 325 g of the cyclic alkoxysiloxane represented by the structural formula (3A), which was obtained in Synthesis Example 1, 187.2 g of (1H,1H,2H,2H-tridecafluorooctyl)trimethoxysilane, and 512 g of toluene, and, then, was added 5.1 g of methanesulfonic acid while stirring. Subsequently, 13.0 g of ion exchanged water was added dropwise thereto over one hour. After the dropping, polymerization was carried out at 25° C. for two hours. The reaction solution obtained was provided with 25.6 g of Kyowaad 500SN (ex Kyowa Chemical Industry Co., Ltd.) and stirred at 25° C. for two hours to be neutralized, and then, remaining methanol and low molecular components were removed by distillation under reduced pressure to obtain organopolysiloxane 13.

The kinetic viscosity of organopolysiloxane 13 thus obtained was 81 mm$^2$/s. Organopolysiloxane 13 obtained is represented by the following average unit formula (a10). The ratios of the respective constituent units were b=1.0, c=0, and e=0.60 from Si-NMR measurement, and the proportion of the constituent unit represented by the structural formula (1') was 5.6 mol %.

The cyclic compound of the raw material did not remain and the unit of the formula (1) was not produced, that is, the cyclic compound was not cleaved. Organopolysiloxane 13 obtained had the constituent unit represented by the structural formula (8), which was derived from the cyclic alkoxysiloxane as the raw material.

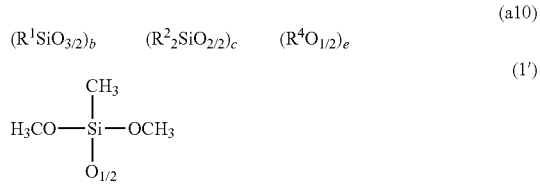

In the formula (a10), $R^1$ is a methyl group or a 1H,1H,2H,2H-tridecafluorooctyl group, and $R^4$ is a methyl group.

Comparative Example 1

Preparation of Organopolysiloxane 14

In a 300 mL separable flask equipped with a stirrer, a reflux condenser, a dropping funnel, and a thermometer, 150 g of methyltrimethoxysilane was put, and 16.7 g of 0.1N hydrochloric acid was added dropwise thereto at 25° C. while stirring to carry out hydrolysis and condensation at 60° C. for two hours. This was heated to 120° C. to remove by-produced methanol by distillation under an atmospheric pressure, followed by filtration to obtain organopolysiloxane 14.

The kinetic viscosity of organopolysiloxane 14 thus obtained was 4 mm$^2$/s. Organopolysiloxane 14 obtained is represented by the average unit formula (a1). The ratios of the respective constituent units were b=1, c=0, and e=1.32 from Si-NMR measurement. The proportion of the constituent unit represented by the structural formula (1') was 42.0 mol %.

Comparative Example 2

Preparation of Organopolysiloxane 15

The procedures in Comparative Example 1 except that the amount of 0.1N hydrochloric acid used was changed to 21.2 g was repeated to obtain organopolysiloxane 15. The kinetic viscosity of organopolysiloxane 15 thus obtained was 21 mm$^2$/s. Organopolysiloxane 15 obtained is represented by the average unit formula (a1). The ratios of the respective constituent units were b=1, c=0, and e=0.86 from Si-NMR measurement. The proportion of the constituent unit represented by the structural formula (1') was 15.3 mol %.

Comparative Example 3

Preparation of Organopolysiloxane 16

The procedures in Comparative Example 1 except that the amount of 0.1N hydrochloric acid used was changed to 22.6 g was repeated to obtain organopolysiloxane 16. The kinetic viscosity of organopolysiloxane 16 thus obtained was 80 mm$^2$/s. Organopolysiloxane 16 obtained is represented by the average unit formula (a1). The ratios of the respective constituent units were b=1, c=0, and e=0.72 from Si-NMR measurement. The proportion of the constituent unit represented by the structural formula (1) was 12.2 mol %.

[3] Preparation of Coating Agent

Examples 1 to 13 and Comparative Examples 1 to 3

100 Parts by mass of the organopolysiloxane each of the Examples 1 to 13 and Comparative Examples 1 to 3 and 5 parts by mass of di-n-butoxy(ethyl acetoacetate) aluminum as a curing catalyst were uniformly mixed using a stirrer to prepare a coating agent. The coating agent obtained was coated on a glass plate with a bar coater No. 5 under air at 25° C. and 50% RH and was heat-cured under air at 105° C. for two hours. Appearance of films were visually observed and evaluated as follows;

when cracks were not observed, the coating film was evaluated as Excellent "E", when cracks were observed in the periphery of the substrate, the coating film was evaluated as Good "G", and when cracks were observed in the periphery of the substrate, the coating film was evaluated as Poor "P".

The result of "Excellent" was defined as qualified and the results of "Good" and "Poor" were defined as disqualified.

Further, the pencil hardness of the coating films at each phase was determined by applying a load of 750 g according to the pencil scratch test prescribed in JIS K 5600-5-4. The results are shown in Table 1 and Table 2.

Further, the cured coatings obtained were aged under air at 150° C. for one hour, the appearance of the films was visually observed for evaluation in the same manner as above. The pencil hardness of the cured coatings after aging was determined in the same manner as above. The results are as shown in Table 1 and Table 2.

TABLE 1

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Organopolysiloxane | 1 | 2 | 3 | 4 | 5 | 6 | 7 | 8 | 9 | 10 | 11 | 12 | 13 |
| Kinetic viscosity at 25° C. mm²/s | 20 | 49 | 71 | 40 | 31 | 42 | 41 | 51 | 45 | 66 | 38 | 61 | 81 |
| Proportion of a unit represented by the structural formula (1'), % | 1.5 | 1.0 | 4.4 | 5.3 | 2.9 | 5.4 | 2.3 | 4.9 | 4.3 | 5.3 | 2.9 | 5.2 | 5.6 |
| After curing at 105° C. for two hours Pencil hardness | 2H | 2H | 2H | 2H | 2H | 3H | 2H | 3H | 2H | 2H | 3H | 2H | 2H |
| After curing at 105° C. for two hours Appearance of film | E | E | E | E | E | E | E | E | E | E | E | E | E |
| After aging at 150° C. for one hour Pencil hardness | 3H | 3H | 3H | 4H | 3H | 4H | 3H | 4H | 3H | 3H | 3H | 3H | 3H |
| After aging at 150° C. for one hour Appearance of film | E | E | E | E | E | E | E | E | E | E | E | E | E |

TABLE 2

| | Comparative Example | | |
|---|---|---|---|
| | 1 | 2 | 3 |
| Organopolysiloxane | 14 | 15 | 16 |
| Kinetic viscosity at 25° C. mm²/s | 4 | 21 | 80 |
| Proportion of a unit represented by the structural formula (1'), % | 42.0 | 15.3 | 12.2 |
| After curing at 105° C. for two hours Pencil hardness | Peeling off and no evaluated | 4H | 3H |
| Appearance of film | P | G | E |
| After aging at 150° C. for one hour Pencil hardness | Peeling off and no evaluated | Peeling off and no evaluated | Peeling off and no evaluated |
| Appearance of film | P | P | P |

As shown in the Table 1, the organopolysiloxanes obtained in Examples 1 to 13 have viscosities similar to those of the organopolysiloxanes obtained in Comparative Examples 1 to 3. In the cured coating obtained from the curing composition comprising the organopolysiloxane of the Examples, cracks are not generated due to heat aging. On the other hand, as shown in Table 2, in the cured coating obtained from the curing composition comprising the organopolysiloxane of Comparative Examples 1 to 3, cracks are generated on the whole surface due to heat aging, and the films are peeled off.

The organopolysiloxane of the present invention provides a cured coating that has a low viscosity and is superior in high hardness and heat resistance and crack resistance. Further, the organopolysiloxane of the present invention is suitable for environment-friendly coating materials without a solvent.

The invention claimed is:

1. An organopolysiloxane represented by the following average unit formula (1) and having a kinetic viscosity of 10 to 350 mm²/s at 25° C., wherein a proportion (%) of the number of silicon atoms in a unit represented by the following formula (1') to a total number of silicon atoms in all siloxane units of the organopolysiloxane is 10% or less,

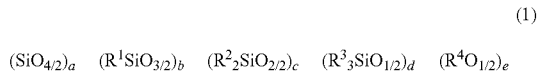

wherein $R^1$, $R^2$, and $R^3$ are, independently of each other, an unsubstituted or substituted, cyclic or non-cyclic alkyl group having 1 to 12 carbon atoms that may include an ether bond, or an unsubstituted or substituted aryl group having 6 to 12 carbon atoms, $R^4$ is a hydrogen atom or an alkyl group having 1 to 10 carbon atoms, and a, b, c, d and e are numbers satisfying the equations $0.2 \geq a \geq 0$, $1 \geq b > 0$, $0.75 \geq c \geq 0$, $0.2 \geq d \geq 0$ and $1 \geq e > 0$, provided that $a+b+c+d=1$, wherein the proportion of the number of silicon atoms in the unit represented by the formula (1') to the total number of silicon atoms in all siloxane units of the organopolysiloxane represented by the formula (1) is 6% or less.

-continued

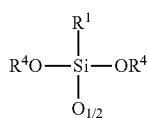

2. An organopolysiloxane represented by the following average unit formula (1) having a constituent unit represented by the following structural formula (2), and having a kinetic viscosity of 10 to 350 mm²/s at 25° C., wherein a proportion (%) of the number of silicon atoms in a unit represented by the following formula (1') to a total number of silicon atoms in all siloxane units of the organopolysiloxane is 10% or less,

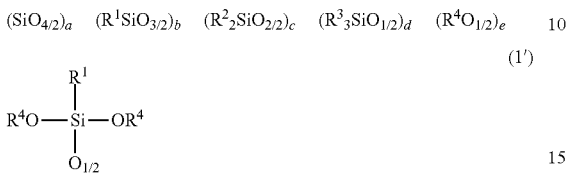

wherein $R^1$, $R^2$, and $R^3$ are, independently of each other, an unsubstituted or substituted, cyclic or non-cyclic alkyl group having 1 to 12 carbon atoms that may include an ether bond, or an unsubstituted or substituted aryl group having 6 to 12 carbon atoms, $R^4$ is a hydrogen atom or an alkyl group having 1 to 10 carbon atoms, and a, b, c, d and e are numbers satisfying the equations $0.2 \geq a \geq 0$, $1 \geq b > 0$, $0.75 \geq c \geq 0.0.2 \geq d \geq 0$ and $1 \geq e > 0$, provided that $a+b+c+d=1$,

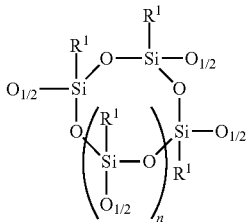

wherein $R^1$ is as defined in the formula (1), and n is an integer of from 1 to 3.

3. The organopolysiloxane according to claim 1, wherein a=0 and d=0 in the formula (1).

4. A method for preparing an organopolysiloxane represented by the following average unit formula (1) and having a kinetic viscosity of 10 to 350 mm²/s at 25° C., wherein a proportion (%) of the number of silicon atoms in a unit represented by the following formula (1') to a total number of silicon atoms in all siloxane units of the organopolysiloxane is 10% or less,

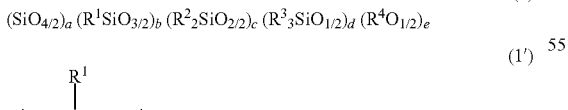

wherein $R^1$, $R^2$, and $R^3$ are independently of each other, an unsubstituted or substituted, cyclic or non-cyclic alkyl group having 1 to 12 carbon atoms that may include an ether bond, or an unsubstituted or substituted aryl group having 6 to 12 carbon atoms, $R^4$ is a hydrogen atom or an alkyl group having 1 to 10 carbon atoms, and a, b, c, d, and e are numbers satisfying the equations $0.2 \geq a \geq 0$, $1 \geq b > 0$, $0.75 \geq c \geq 0$, $0.2 \geq d \geq 0$ and $1 \geq e > 0$, provided that $a+b+c+d=1$, wherein the method comprises a step of subjecting a cyclic siloxane represented by the following general formula (3):

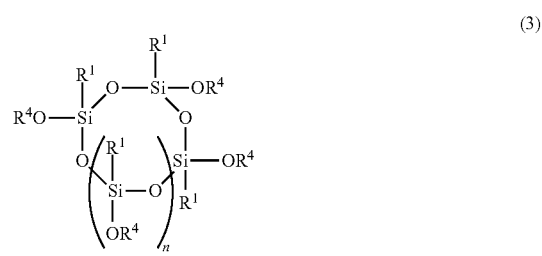

wherein $R^1$, $R^4$ and n are as defined above, to hydrolysis and condensation in the presence of an acid catalyst to obtain the organopolysiloxane represented by the formula (1).

5. The method according to claim 4, comprising a step of subjecting one or more selected from the group consisting of the cyclic siloxane represented by the general formula (3) and hydrolysis condensate thereof, and one or more selected from the group consisting of a silane represented by the following general formula (4):

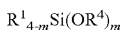

wherein $R^1$ and $R^4$ are as defined above, and m is an integer of from 1 to 4, and hydrolysis condensate thereof to cohydrolysis and condensation in the presence of an acid catalyst.

6. The method according to claim 5, comprising a step of obtaining an organopolysiloxane wherein m is 2 or 3 in the formula (4) and a=0 and d=0 in the formula (1).

7. A curable composition comprising the (A) organopolysiloxane according to claim 1 and a (B) curing catalyst.

8. The curable composition according to claim 7, wherein the (B) curing catalyst is one or more selected from the group consisting of an aluminum compound, a titanium compound, a Brønsted acid, and an amine compound.

9. A cured product formed by curing the curable composition according to claim 7.

10. A coating agent comprising the curable composition according to claim 7.

11. An article having a coated layer of the cured product according to claim 9.

12. The organopolysiloxane according to claim 1, comprising a constituent unit represented by the following structural formula (2):

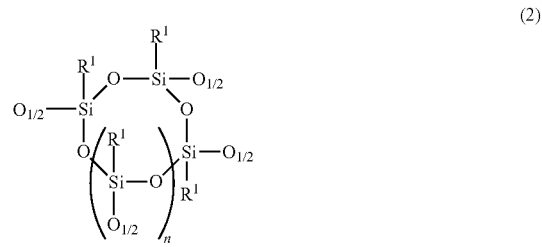

wherein $R^1$ is as defined in the formula (1), and n is an integer of from 1 to 3.

13. The organopolysiloxane according to claim 2, wherein a=0 and d=0 in the formula (1).

14. A curable composition comprising the (A) organopolysiloxane according to claim 2 and a (B) curing catalyst.

15. A cured product formed by curing the curable composition according to claim 8.

16. The organopolysiloxane according to claim 2, wherein the proportion of the number of silicon atoms in the unit represented by the formula (1') to the total number of silicon atoms in all siloxane units of the organopolysiloxane represented by the formula (1) is 6% or less.

17. The organopolysiloxane according to claim 2, wherein a=0 and d=0 in the formula (1).

18. A cured product formed by curing the curable composition according to claim 14.

19. A coating agent comprising the curable composition according to claim 14.

20. An article having a coated layer of the cured product according to claim 19.

* * * * *